(12) United States Patent
Peet

(10) Patent No.: US 7,703,181 B2
(45) Date of Patent: Apr. 27, 2010

(54) CORD TENSIONING APPARATUS AND METHOD OF SECURING A CORD USING THE SAME

(76) Inventor: Jay K. Peet, 129 E. Vintage, Nipomo, CA (US) 93444

( * ) Notice: Subject to any disclaimer, the term of this patent is extended or adjusted under 35 U.S.C. 154(b) by 471 days.

(21) Appl. No.: 11/325,968

(22) Filed: Jan. 4, 2006

(65) Prior Publication Data
US 2007/0151083 A1   Jul. 5, 2007

(51) Int. Cl.
*F16G 11/00* (2006.01)
(52) U.S. Cl. .................................. 24/130; 24/132 R
(58) Field of Classification Search ............... 24/115 R, 24/129 R, 130, 132 AA, 132 R
See application file for complete search history.

(56) References Cited

U.S. PATENT DOCUMENTS

| 322,501   | A  | * | 7/1885  | Taylor ....................... 24/129 R |
| 521,056   | A  | * | 6/1894  | Steelman ................... 24/132 R |
| 1,087,012 | A  | * | 2/1914  | Heberling .................. 24/132 R |
| 2,861,535 | A  |   | 11/1958 | Hutchison et al. |
| 2,892,230 | A  | * | 6/1959  | Lopez ....................... 24/129 R |
| 3,574,900 | A  |   | 4/1971  | Emery |
| 3,812,811 | A  |   | 5/1974  | Rodriguez |
| 4,019,609 | A  | * | 4/1977  | Wagner ..................... 24/136 R |
| 4,541,149 | A  | * | 9/1985  | Jensen ....................... 24/134 R |
| 5,014,941 | A  | * | 5/1991  | Sherman ................... 24/135 K |
| 5,522,120 | A  |   | 6/1996  | Brinning |
| 5,675,872 | A  |   | 10/1997 | Emery |
| 5,802,679 | A  |   | 9/1998  | Neely |
| 5,806,452 | A  | * | 9/1998  | Benoit ........................ 114/218 |
| 5,878,684 | A  |   | 3/1999  | Adams |
| 5,987,710 | A  | * | 11/1999 | Paul et al. ..................... 24/130 |
| 5,987,711 | A  | * | 11/1999 | Parsons ........................ 24/130 |
| 6,094,783 | A  | * | 8/2000  | Parsons ........................ 24/130 |
| 6,163,936 | A  | * | 12/2000 | Benoit .......................... 24/130 |
| 6,260,498 | B1 | * | 7/2001  | Cochran ....................... 24/130 |
| 6,269,523 | B1 | * | 8/2001  | Benoit .......................... 24/130 |
| 7,428,769 | B2 | * | 9/2008  | Fontaine et al. ............... 24/130 |

OTHER PUBLICATIONS

Int'l Searching Authority, *International Search Report and Written Opinion* for PCT/US07/60066 mailed Aug. 6, 2008.

* cited by examiner

*Primary Examiner*—Robert J Sandy
(74) *Attorney, Agent, or Firm*—Thomas F. Lebens; Sinsheimer Juhnke Lebens & McIvor, LLP

(57) ABSTRACT

A cord tensioning apparatus includes a first cord guide, a second cord guide, and a cord cleat coupled between the first and second cord guides, the cord cleat including a groove, the cord cleat adapted to grip a portion of a cord occupying a cord gripping region within the groove. The first and second cord guides are adapted to receive a cord and restrict a movement of the cord within the cord cleat.

20 Claims, 6 Drawing Sheets

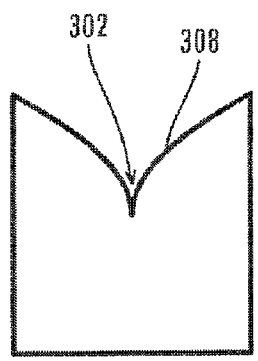
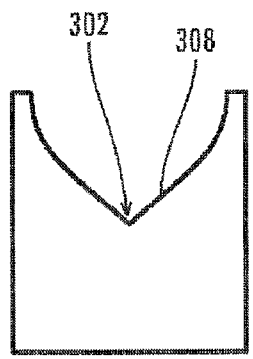
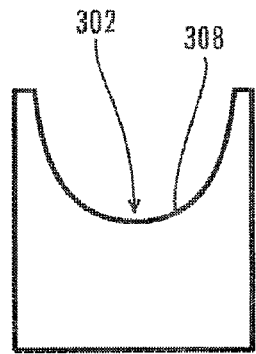
Fig. 8  Fig. 9  Fig. 10
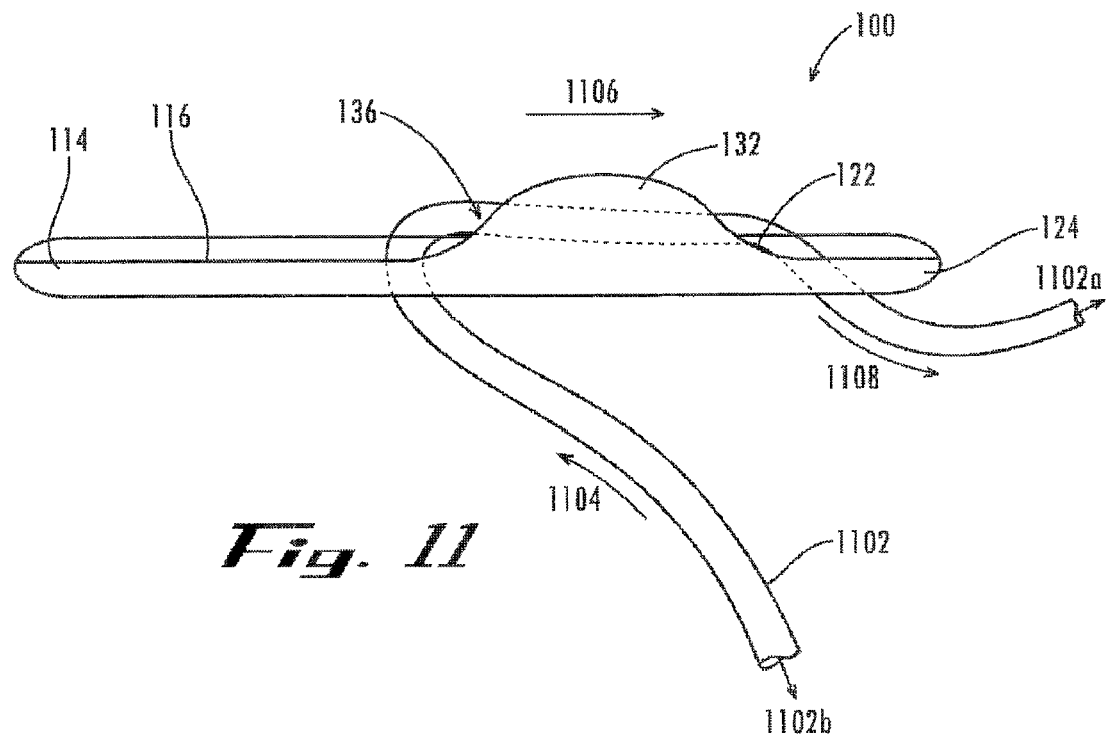
Fig. 11

CORD TENSIONING APPARATUS AND METHOD OF SECURING A CORD USING THE SAME

BACKGROUND OF THE INVENTION

1. Field of the Invention

The present invention relates generally to cord tensioning apparatus.

2. Discussion of the Related Art

Cord tensioning apparatus for securing loads to external structures are well known in the art. Many such devices are implemented as cleat-type devices that are permanently secured, attached, or mounted to some external structure. Further, many known cleat-type devices involve complicated cord threading processes that are not only time consuming but also increase the likelihood that a cord securing a load is insufficiently tensioned, or improperly coupled to an external structure. Thus, there is a for a cord tensioning apparatus incorporating a cleat that overcomes the foregoing shortcomings and failings of the known art by allowing a user to simply, quickly, and reliably thread a cord through a cleat that can be readily attached to and detached from an external structure.

SUMMARY OF THE INVENTION

Several embodiments of the invention advantageously address the needs above as well as other needs by providing a cord tensioning apparatus that includes a first cord guide; a second cord guide; and a cord cleat coupled between the first and second cord guides, wherein the cord cleat includes a groove and wherein the cord cleat is adapted to grip a portion of a cord occupying a cord gripping region within the groove. The first and second cord guides are adapted to receive a cord and restrict a movement of the cord within the cord cleat.

Another embodiment of the present invention provides a cord tensioning apparatus including a base; a first guide coupled to the base, the first guide including a first guide channel defined therein adapted to receive a cord; a cord retaining member adjacent to the first guide, the cord retaining member including a cord receiving aperture defined therein adapted to receive the cord; a second guide coupled to the base, the second guide including a second channel defined therein adapted to receive the cord; a cord cleat coupled to the base between the first and second guides, the cord cleat including a groove extending longitudinally between the channels of the first and second guides, the cord cleat adapted to grip a portion of a cord occupying a cord gripping region within the groove; a cord tensioning member coupled to the base and aligned with the channel of the second guide, the cord tensioning member including a cord contacting surface adapted to contact a portion of the cord; and wherein the channel of the first guide is elevationally between the cord gripping region and an end of the cord receiving aperture, and wherein the channel of the second guide is elevationally between the cord gripping region and the cord contacting surface.

Another embodiment of the present invention provides a method of securing a cord to an external structure that includes providing a cord having a free end and a loaded end; inserting a free end through a first cord guide of a cord tensioning apparatus; guiding the inserted free end through a cord cleat coupled to the first cord guide; threading the guided free end through a second cord guide coupled to the cord cleat; and pulling on the threaded free end to remove slack between the loaded end and the cord tensioning apparatus.

BRIEF DESCRIPTION OF THE DRAWINGS

The above and other aspects, features and advantages of several embodiments of the present invention will be more apparent from the following more particular description thereof, presented in conjunction with the following drawings.

FIGS. 4 to 10 illustrate adjustable design aspects of the cord cleat in accordance with embodiments of the present invention.

FIG. 11 illustrates a method of securing a cord within the exemplary cord tensioning apparatus incorporating the cord cleat shown in FIG. 3.

Figure 1:
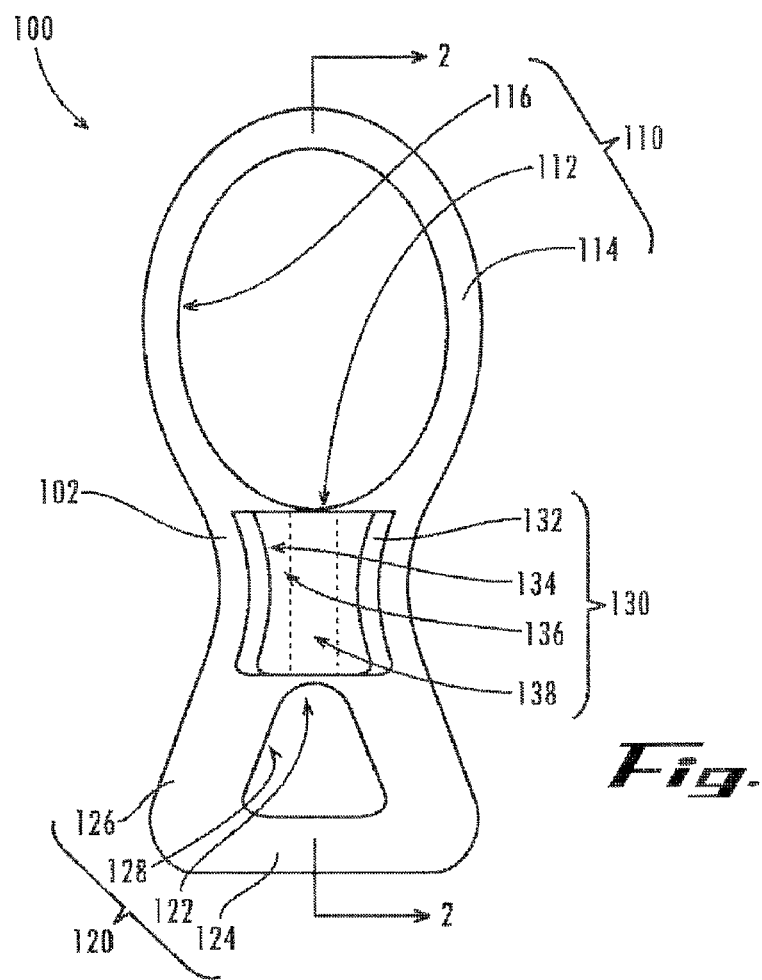
FIG. 1 illustrates a top view of a cord tensioning apparatus in accordance with general embodiments of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Figure 2:
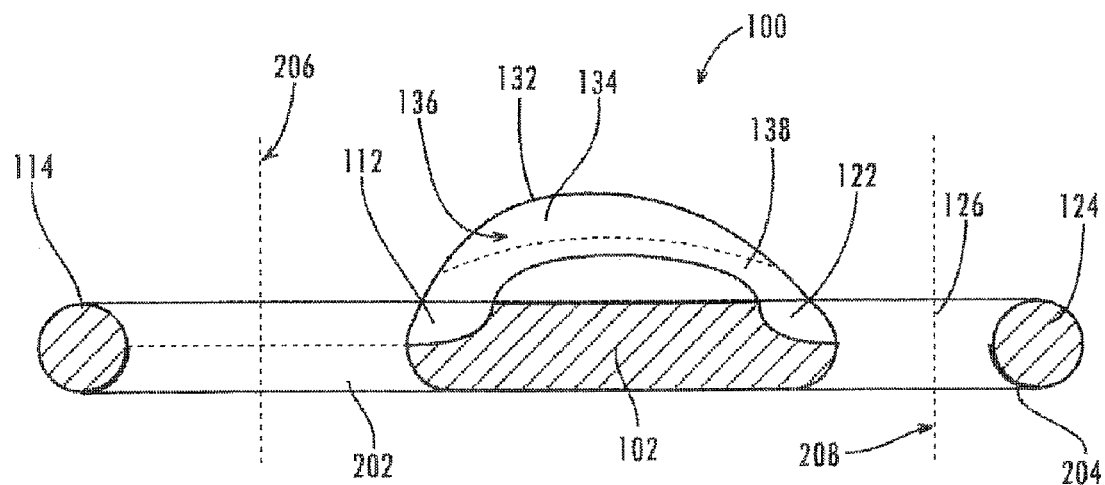
FIG. 2 illustrates a sectional view of cord tensioning apparatus shown in FIG. 1 taken along line I-I'.

A cord tensioning apparatus 100 in accordance with embodiments of the present invention is exemplarily illustrated in FIGS. 1 and 2.

Referring to FIG. 1, the cord tensioning apparatus 100 includes a first cord guide 110, a second cord guide 120, and a cord cleat 130 coupled to each other via base 102. The first cord guide 110 includes a first (i.e., an input) guide 112, a cord retaining member 114, and a cord receiving aperture 116. The second cord guide 120 includes a second (i.e., an output) guide 122, a cord tensioning member 124, and a support arm 126. The cord cleat 130 generally includes a pair of opposing sidewalls 132 coupled to the base 102 and having opposing internal surfaces 134 that define a groove 136 having cross-sectional dimensions that define a cord gripping region 138 where a cord can be gripped by ridges of a cleat and held therein.

The first cord guide 110 is generally adapted to receive a cord (e.g., an elongated rope, line, bungee cord, etc.) having a load coupled to one end thereof, restrain a lateral movement of the received cord and align the received cord with the groove 136 of the cord cleat 130. Further, the first cord guide 110 may be coupled to an external structure via, for example, a clip device attached to the external structure. By coupling the first cord guide 110 to an external structure, the cord tensioning apparatus 100 can be used to secure the cord to the external structure. Accordingly, the cord receiving aperture 116 can be dimensioned so as to receive a cord (not shown) and to restrict a radial movement of portions of the cord within the cord receiving aperture 116 about a longitudinal axis thereof (see, for example, first longitudinal axis 206 in FIG. 2). Further, the input guide 112 is between cord retaining member 114 and the cord cleat 130 and may include a channel that is substantially aligned with the groove 136, thereby facilitating movement of the cord from the first cord guide 110 into the cord cleat 130. As illustrated in FIG. 1, the channel of the input guide 112 is grooved and/or concaved in a direction horizontally transverse to the first longitudinal axis 206 of the cord retaining aperture 116 to minimize the amount of wear that a cord may experience as it travels through the cord tensioning apparatus 100.

The second cord guide 120 is generally adapted to enable a user to remove slack in the cord between the load and the cord tensioning apparatus. Accordingly, the output guide 122 is between the cord tensioning member 124 and the cord cleat 130 and may include a channel that is substantially aligned with the groove 136, thereby facilitating movement of the cord from the cord cleat 130 to the second cord guide 120. The cord tensioning member 124 is set apart from the output guide 122 via the support arm 126 and is adapted to ensure that a length of cord is maintained within the groove 136 as a user removes slack in the cord between the load and the cord tensioning apparatus 100. In one embodiment, two support arms 126 are coupled between the cord tensioning member 124 and the output guide 122, thereby forming a cord tensioning aperture 128 adapted to restrict a radial movement of a portion of the cord that is disposed therein about a longitudinal axis thereof (see, for example, second longitudinal axis 208 in FIG. 2) and to restrict movement of the cord tensioning apparatus 100 while securing a loaded cord thereto. Similar to the channel of the input guide 112, the channel of the output guide 122 is grooved and/or concaved along a horizontal direction to minimize the amount of wear that a cord may experience as it travels through the cord tensioning apparatus 100.

As will be discussed in greater detail below, the cord cleat 130 is generally adapted to grip and hold a cord within the cord gripping region 138 when the first and second cord guides 110 and 120 are used cooperatively (e.g., when a cord is being threaded through the first cord guide 110 and into the second cord guide 120).

Referring to FIG. 2, the cord retaining member 114 includes a cord retaining surface region 202 and the cord tensioning member 124 includes a cord engaging surface 204. The aforementioned first longitudinal axis is generally shown at 206 and the aforementioned second longitudinal axis is generally shown at 208.

The cord retaining surface region 202 defines the dimensions of the cord receiving aperture 116. As illustrated, the output end of the cord receiving aperture 116 (i.e., the end of the cord receiving aperture 116 that a cord exits before it enters the cord cleat 130) is disposed elevationally below the cord gripping region 138. In another embodiment, the output end of the cord receiving aperture 116 may be disposed level with, but not extend elevationally above, the cord gripping region 138. As illustrated, the input guide 112 can additionally have a surface topography that is grooved and/or concaved a direction vertically transverse to the first longitudinal axis 206 of the cord retaining aperture 116.

The cord contacting surface region 204 of the cord tensioning member 124 is disposed elevationally below the cord gripping region 138. In another embodiment, the cord contacting surface region 204 of the cord tensioning member 124 may be disposed level with, but not extend elevationally above, the cord gripping region 138. As illustrated, the output guide 122 can additionally have a surface topography that is grooved and/or concaved a direction vertically transverse to the second longitudinal axis 208 of the cord tensioning aperture 128.

As shown in FIG. 2, the channels of the aforementioned input and output guides 112 and 122, respectively, are disposed elevationally between either the cord retaining aperture 116 or the cord contacting surface region 204 and the cord gripping region 138.

While the first and second cord guides 110 and 120 have been exemplarily illustrated in FIGS. 1 and 2 as being generally provided as cylindrical loops, it will be appreciated that the first and second cord guides 110 and 120 may be provided in substantially any desired configuration. In one embodiment, for example, the first and second cord guides 110 and 120 may each be provided as an integrated component of the cord tensioning apparatus 100. In another embodiment, the first and second cord guides 110 and 120 can be integrally formed with the base 102. In another embodiment, the first and second cord guides 110 and 120, as well as the cord cleat 130, may be formed from a hard, durable material such as nylon, cast aluminum, stainless steel, or the like.

Figure 3:
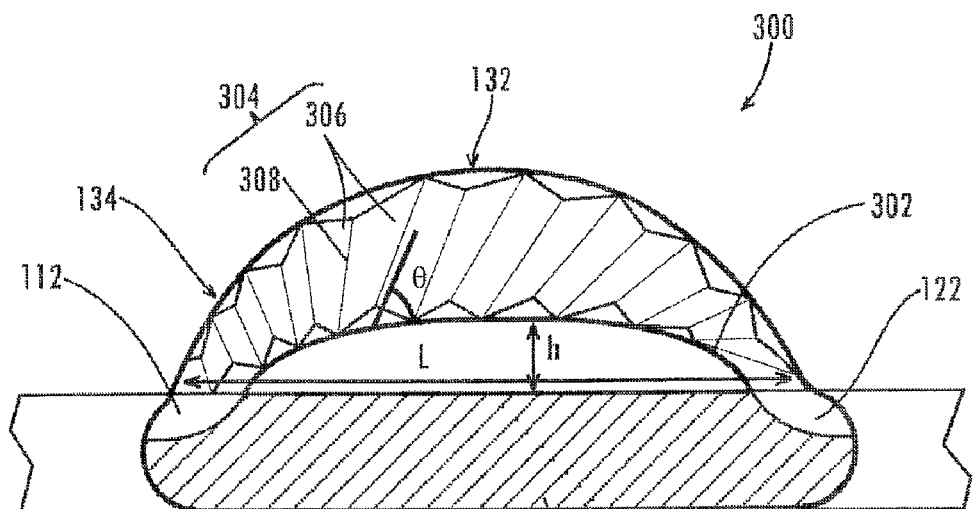
FIG. 3 illustrates an enlarged view of a cord cleat in accordance with one embodiment, implemented within the cord tensioning apparatus shown in FIGS. 1 and 2.

Referring to FIG. 3, the cord cleat 130 is provided as a jam cleat assembly 300. Accordingly, the illustrated jam cleat assembly 300 includes the aforementioned sidewalls 132, a groove base 302 formed where internal surfaces 134 of the sidewalls 132 meet, a plurality of ridges 304 having ridge surfaces 306 and ridge lines 308 are provided on opposing internal surfaces 134 of the sidewalls 132.

In one embodiment, the jam cleat assembly 300 is integrally formed with the base 102. In an alternate embodiment, the jam cleat assembly 300 is attached to the base 102 via an attachment means such as an adhesive, screws, or the like, or combinations thereof.

As shown, each of the ridges 304 includes a plurality of ridge surfaces 306 that extend from the internal surface 134 of a sidewall 132 into the groove 136. The ridge surfaces 306 define ridge lines 308 that extend from the groove base 302 to an upper portion of the sidewalls 132 at a ridge angle, theta ($\theta$), measured with respect to an adjacent portion of the groove base 302. Accordingly, the ridge surfaces 306 and ridge lines 308 define the aforementioned cross-sectional dimensions of the groove 136.

According to various embodiments, the degree to which a cord can be gripped within the cord gripping region 138 varies (e.g., decreases) in a direction progressing along the length of the groove 136 from the input guide 112 to the output guide 122. Alternatively, the degree to which a cord can be gripped within the cord gripping region 138 may remain substantially constant along the length of the groove 136 from the input guide 112 to the output guide 122. Accordingly, numerous design aspects of the jam cleat assembly 300 (e.g., ridge angle, ridge length, ridge height, ridge shape, and the like, and combinations thereof) may be adjusted to influence the width, depth, and axial and elevational positions (herein collectively referred to as "dimensions") of the cord gripping region 138 within the groove 136. It will be appreciated that one of ordinary skill in the art can adjust the dimensions of the cord gripping region 138 without undue experimentation to satisfactorily adjust the degree to which a cord (e.g., formed of a particular material and having a particular diameter) can be gripped and held within the cord gripping region 138. Exemplary design aspects, adjustable in accordance with principles of the present invention, are described in greater detail below.

As shown in FIG. 3, the ridge angle, theta (θ), varies (e.g., decreases) along a direction progressing from the input guide 112 to the output guide 122. Alternatively, the ridge angle may remain substantially constant. Further, the groove base 302 may be arcuately provided, wherein the peak of the groove base 302 is arranged at any suitable height, h, above the base 102 and at any suitable point along the length, l, of the groove 136. According to various embodiments, the arcuately provided groove base 302 can be provided as an arc having a substantially constant radius between the input and output guide channels 112 and 122, or have a radius that increases or decreases along a direction progressing from the input guide 112 to the output guide 122. Alternatively, the groove base 302 may be substantially flat.

Figure 4:
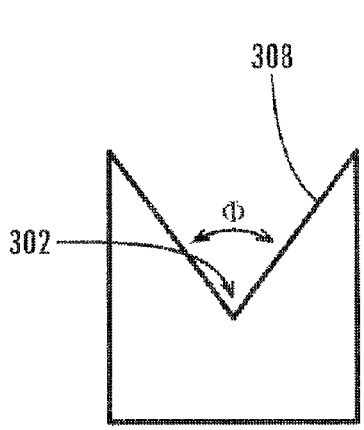
Figure 5:
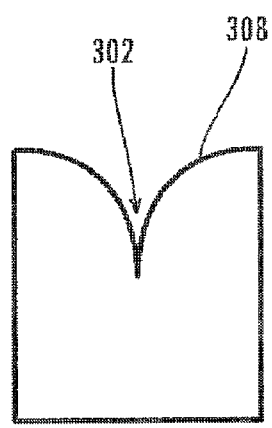
Figure 6:
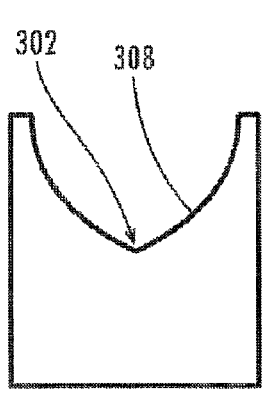
Figure 7:
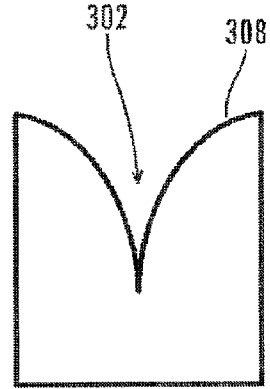

As shown in FIG. 4, each ridge line 308 is substantially straight to define a groove base angle, phi (Φ). In other embodiments, however, each ridge line 308 may be arcuately provided in a convex shape having a substantially constant radius (see, for example, FIG. 5), in a concave shape having a substantially constant radius (see, for example, FIG. 6), in a convex shape having an increasing or decreasing radius progressing toward the groove base 302 (see, for example, FIGS. 7 and 8, respectively), or in a concave shape having an increasing or decreasing radius progressing toward the groove base 302 (see, for example, FIGS. 9 and 10, respectively). Although not explicitly shown, it will be appreciated that the ridge line shapes exemplarily illustrated in FIGS. 5 to 10 implicitly form groove base angles. In another embodiment, the shape of the ridge lines 308 may be change along the length of the groove 136, progressing from the input guide 112 to the output guide 122 so as to, for example, result in a larger groove base angle near the output guide 122 than the groove base angle near the input guide 112.

Having generally described the cord tensioning apparatus 100 above with respect to FIGS. 1-10, an exemplary method of securing a loaded cord thereto will now be discussed in greater detail with respect to FIG. 11.

Referring to FIG. 11, a cord 1102 having a first end (i.e., a free end) 1102a and a second end (i.e., a loaded end) 1102b is provided. When a user wishes to attach a load (not shown) coupled to the loaded end 1102b of the cord 1102, the user may attach the cord tensioning apparatus 100 to an external structure as described above and thread the cord 1102 through the cord tensioning apparatus 100 and pull on the free end 1102a so as to remove a desired amount of slack between the cord tensioning apparatus 100 and the loaded end 1102b.

To thread the cord 1102, the free end 1102a is inserted through the cord receiving aperture 116 (e.g., along a direction indicated at 1104), directed over the input guide 112, guided into an upper portion of the groove 136 (e.g., along a direction indicated at 1106), directed over the output guide 122, and guided below the cord tensioning member 124 (e.g., along a direction indicated at 1108).

After having threaded the cord 1102, the user pulls on the free end 1102a to remove a desired amount of slack in the cord between the cord tensioning apparatus 100 and the loaded end 1102b. Due to the spatial relationship between the second cord guide 120 and the cord cleat 130, the cord 1102 is simultaneously pulled through the groove 136 along the direction indicated at 1106 and biased into the groove 136 toward the groove base 302. As the user pulls on the cord 1102, the depth that the cord 1102 is biased into the groove 136 increases and, consequently, the degree to which the cord gripping region 138 frictionally engages the biased portion of the cord 1102 increases.

After having removed a desired amount of slack between the cord tensioning apparatus 100 and the loaded end 1102b, the user releases the free end 1102a and the cord gripping region 138 retains the portion of the cord 1102 biased therein. Because the first cord guide 110 is adapted to restrain a lateral movement of the received cord 1102 within the cord retaining aperture 116, the portion of the cord 1102 between the loaded end 1102b and the input guide 112 is prevented becoming pulled out of the cord gripping region 138. Moreover, because the second cord guide 120 is adapted to restrain a lateral movement of the received cord 1102 within the cord tensioning aperture 128, the portion of the cord 1102 between the free end 1102a and the output guide 122 can be prevented becoming pulled out of the cord gripping region 138. To remove the cord 1102 from the cord tensioning apparatus 100, the user pulls the portion of the cord 1102 near the output guide 122 away from the cord gripping region 138.

Accordingly, the cord tensioning apparatus 100 described above with respect to FIGS. 3-11 enables a user to secure a load to an external structure without the use of knots or complicated threading of the cord 1102.

Figure 12:
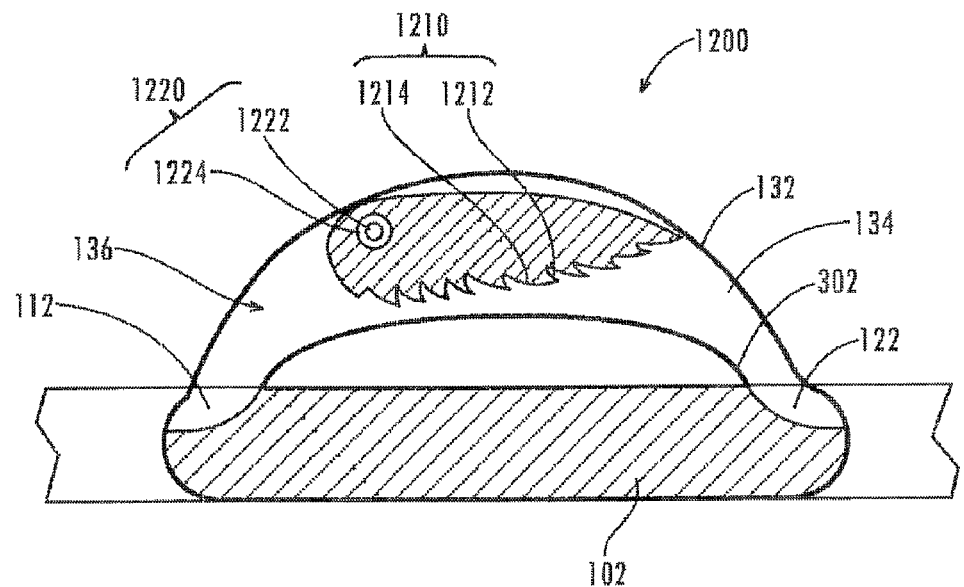
FIG. 12 illustrates an enlarged view of a cord cleat in accordance with another embodiment, implemented within the cord tensioning apparatus shown in FIGS. 1 and 2.

Referring to FIG. 12, the cord cleat 130 is provided as a cam cleat assembly 1200. As illustrated, cam cleat assembly 1200 includes the aforementioned sidewalls 132 and a cam cleat 1210 coupled to the internal surfaces 134 of the sidewalls 132 via a fastening assembly 1220. In the illustrated embodiment, the cam cleat 1210 includes a plurality of ridges 1212 having ridge surfaces 1214 and ridge lines 1216 and the fastening assembly 1220 includes a pin 1222 and pin opening 1224. As similarly described above with respect to FIG. 3, a groove base 302 may be defined where internal surfaces 134 of the sidewalls 132 meet.

In one embodiment, the sidewalls 132 (and the various features they define such as the sidewalls 134 and groove base 302) of the cam cleat assembly 1200 are integrally formed with the base 102. In an alternate embodiment, the sidewalls 132 of the cam cleat assembly 1200 are attached to the base 102 via an attachment means such as an adhesive, screws, or the like, or combinations thereof.

As shown, each of the ridges 1212 includes a plurality of ridge surfaces 1214 that extend from the cam cleat 1210 into the groove 136. The ridge surfaces 1214 define ridge lines 1216 that extend transversely between the internal surfaces 134 of sidewalls 132.

The fastening assembly 1220 enables the cam cleat 1210 to move (e.g., rotate) either toward or away from the groove base 302. Accordingly, the pin 1222 is inserted through the pin opening 1224 and opposing ends of the pin 1222 are inserted into pin anchor openings (not shown) formed in the opposing internal surfaces 134 of sidewalls 132. In one embodiment, the cam cleat 1210 is spring loaded such that it is biased into the groove 136.

Figure 13:
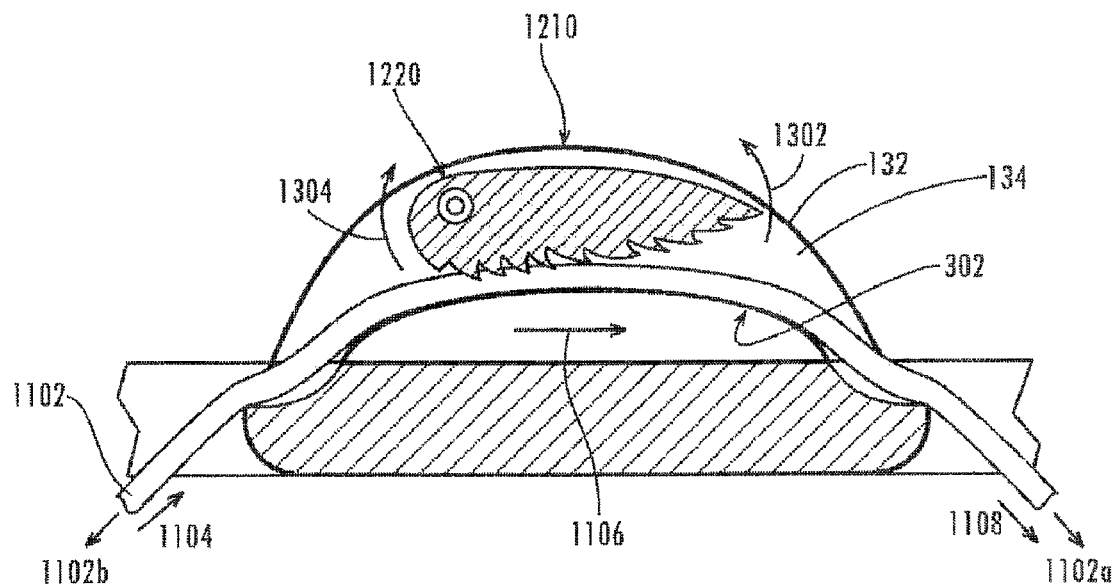
FIG. 13 illustrates a method of securing a cord within the exemplary cord tensioning apparatus incorporating the cord cleat shown in FIG. 12.

Having generally described the cord tensioning apparatus 100 above with respect to FIG. 12, an exemplary method of securing a cord thereto will now be discussed in greater detail with respect to FIG. 13.

As similarly discussed with respect to FIG. 11, the user may attach a load (not shown) coupled to the loaded end 1102b of the cord 1102 to an external structure by, for example, attaching the cord tensioning apparatus 100 to an external structure, threading the cord 1102 through the cord tensioning apparatus 100, and pulling on the free end 1102a to remove a desired amount of slack in the cord 1102 between the cord tensioning apparatus 100 and the loaded end 1102b.

To thread the cord 1102, the free end 1102a is inserted through the cord receiving aperture (not shown) along, for example, a direction indicated at 1104, directed over the input guide 112, guided through the groove 136 (e.g., along a direction indicated at 1106), directed over the output guide 122, and guided below the cord tensioning member (not shown) along, for example, a direction indicated at 1108. As shown, the portion of the cord 1102 disposed within the groove 136 contacts the ridges 1212 of cam cleat 1210, causing the cam cleat 1210 to rotate (e.g., along a direction indicated at 1302) away from the groove base 302 via fastening means 1220.

After having threaded the cord 1102, the user pulls on the free end 1102a to drag a length of cord 1102 through the groove 136 and remove a desired amount of slack between the cord tensioning apparatus 100 and the loaded end 1102b and releases the free end 1102a once a desired amount of slack has been removed.

After having removed a desired amount of slack from the cord 1102, the user releases the free end 1102a and the cam cleat 1210 rotates along the direction indicated at 1304 (e.g., due to a tension in portion of the cord 1102 between the load and the cord tensioning apparatus 100). Accordingly, the cord tensioning apparatus 100 described above with respect to FIGS. 12 and 13 enables a user to secure a load to an external structure without the use of knots or complicated threading of the cord 1102.

Figure 14:
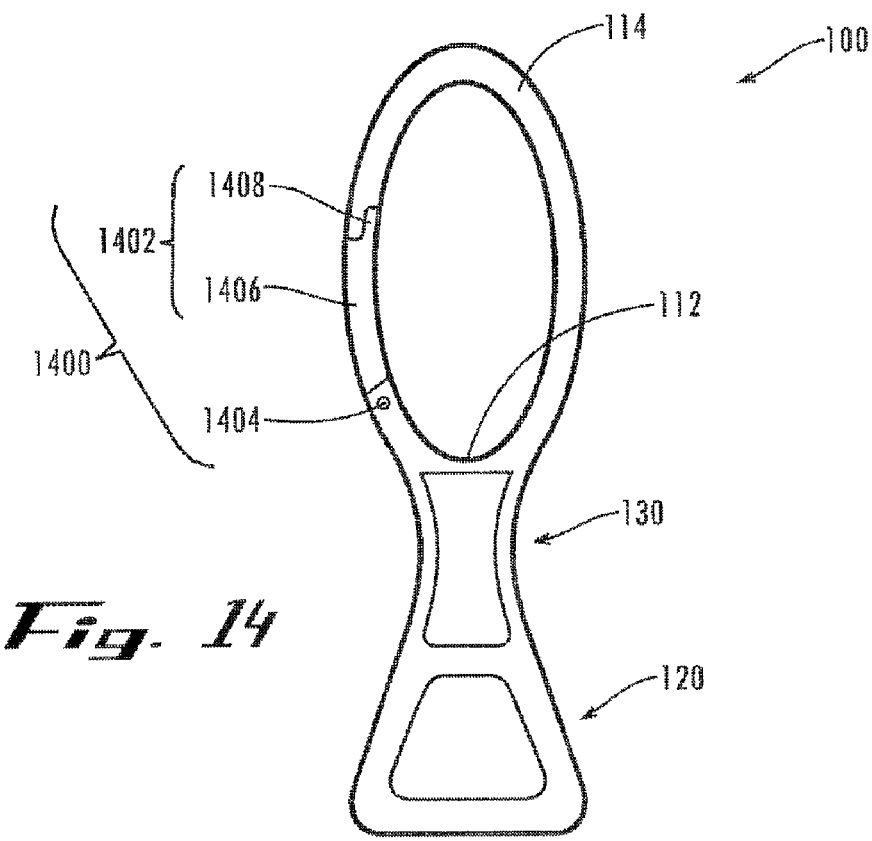
FIGS. 14 to 17 illustrate attachment means according to various embodiments of the present invention.

As described above with respect to FIGS. 1 and 2, the cord retaining member 114 of the first cord guide 110 is generally provided as a cylindrical loop and is thus adapted to be coupled to an external structure via, for example, a clip-on anchoring device coupled to the external structure. Referring to FIG. 14, however, an embodiment of present invention provides the first cord guide 110 with a coupling device 1400 that allows the cord retaining aperture 116 to be selectively opened and closed to receive and retain an anchoring member (e.g., a closed loop) that is, in turn, coupled to an external structure.

Figure 15:
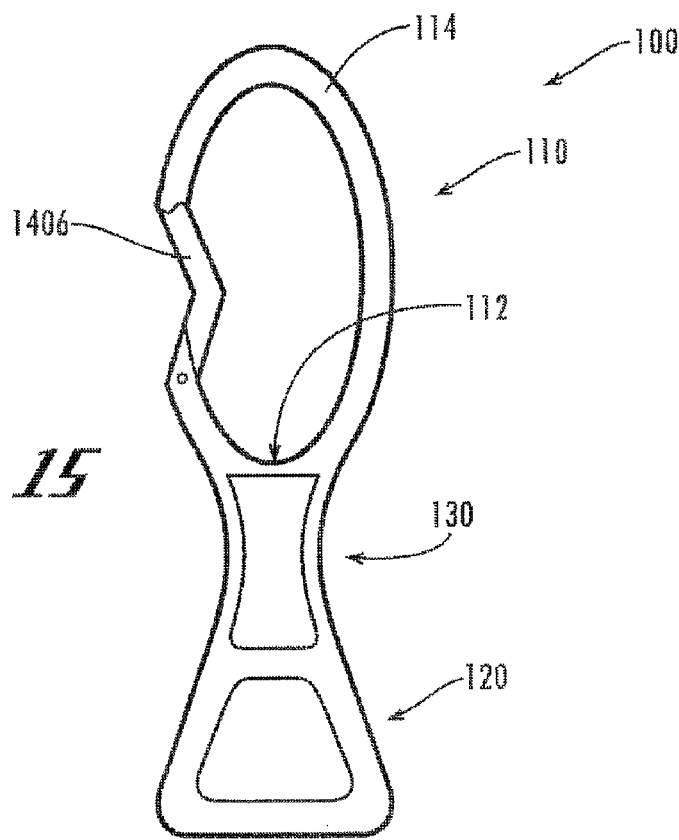
Figure 16:
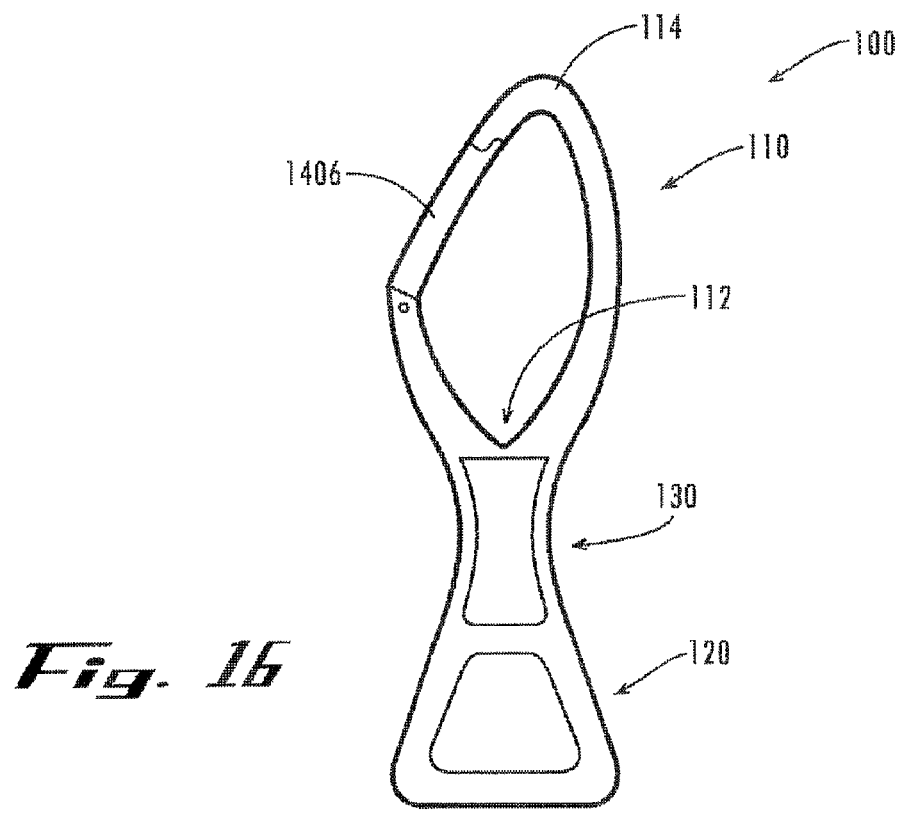

As shown in FIG. 14, the coupling device 1400 can be included within the first cord guide. Such a coupling device 1400 includes, for example, a spring-loaded clip 1402 hingedly coupled to the cord retaining member 114 via hinge 1404. Accordingly, the clip 1402 includes a clip body 1406 that partially defines the cord receiving aperture 116 a clip stop portion 1408 that is adapted to contact a terminal portion of the cord retaining member 114. The clip 1402 can be rotated into the cord receiving aperture 116 to open the cord receiving aperture 116, allowing the first cord guide 110 to receive the aforementioned anchoring member coupled to the external structure. The cord receiving aperture 116 is closed, however, when the clip stop portion 1408 contacts the terminal portion of the cord retaining member 114. As illustrated, the clip body 1406 is provided as a convex bar. In alternate embodiments, however, the clip body 1406 can be provided as a concave bar (see, for example, FIG. 15) or a straight bar (see, for example, FIG. 16).

Figure 17:
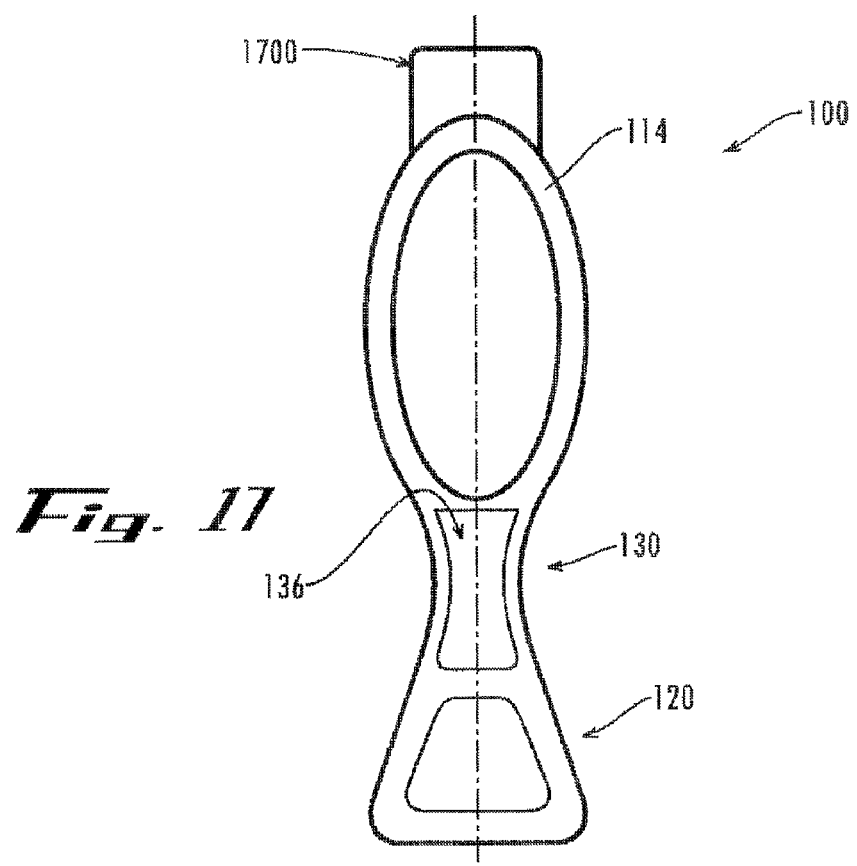

In an alternate embodiment of present invention exemplarily shown in FIG. 17, the cord tensioning apparatus 100 includes a coupling device 1700 that attaches directly to an anchoring member of an external structure. As illustrated, the coupling device 1700 is coupled to first cord guide (e.g., the cord retaining member 114) and is substantially aligned with the groove 136 of the cord cleat 130. The coupling device 1700 may be provided as substantially device (e.g., a latch, a catch, etc.) adapted to couple to an anchoring member of an external structure. Further, the coupling device 1700 may be rigidly moveably coupled to the cord retaining member 114.

While the invention herein disclosed has been described by means of specific embodiments, examples and applications thereof, numerous modifications and variations could be made thereto by those skilled in the art without departing from the scope of the invention set forth in the claims.

What is claimed is:

1. A cord tensioning apparatus, comprising:
    a base;
    a first guide coupled to the base, the first guide including a first guide channel defined therein adapted to receive a cord;
    a cord retaining member adjacent to the first guide, the cord retaining member including a cord receiving aperture defined therein adapted to receive the cord;
    a second guide coupled to the base, the second guide including a second channel defined therein adapted to receive the cord;
    a cord cleat coupled to the base between the first and second guides, the cord cleat including a groove extending longitudinally between the channels of the first and second guides, the cord cleat adapted to grip a portion of a cord occupying a cord gripping region within the groove;
    a cord tensioning member coupled to the base and aligned with the channel of the second guide, the cord tensioning member including a cord contacting surface adapted to contact a portion of the cord; and
    a coupling device fixedly coupled to the cord retaining member, the coupling device adapted to couple the cord tensioning apparatus to an external structure,
    wherein the channel of the first guide is elevationally disposed between the cord gripping region and an end of the cord receiving aperture,
    wherein the channel of the second guide is elevationally disposed between the cord gripping region and the cord contacting surface,
    wherein the channel of the first guide is grooved in a direction horizontally transverse to a first longitudinal axis of the cord receiving aperture and in a horizontal direction relative to a longitudinal axis of the apparatus for minimizing wear of the cord while traveling through the apparatus,
    wherein the channel of the second guide is grooved in a direction horizontally transverse to a second longitudinal axis of the cord receiving aperture and in a horizontal direction relative to a longitudinal axis of the apparatus for minimizing wear of the cord while traveling through the apparatus,
    wherein a degree to which the cord is gripped within the cord gripping region comprises a condition selected from a group consisting essentially of:
    varying in a direction progressing along the length of the groove from the first guide to the second guide; and
    remaining substantially constant along the length of the groove from the first guide to the second guide,
    wherein the cord is adjustable while the portion of the cord is disposed in the groove,
    wherein the cord is biasable into the groove, whereby a biased cord portion is provided, and whereby a degree to which the cord gripping region frictionally engages the biased cord portion increases by pulling the cord in a cord-tensioning direction, and
    wherein the cord is debiasable from the groove, whereby a debiased cord portion is provided, and whereby a degree to which the cord gripping region frictionally engages the debiased cord portion decreases by pulling the cord in a direction opposite to the cord-tensioning direction.

2. The cord tensioning apparatus of claim 1, wherein the cord cleat is integrally formed with the base.

3. The cord tensioning apparatus of claim 1, wherein the cord cleat includes a jam cleat assembly.

4. The cord tensioning apparatus of claim 1, wherein the cord cleat includes a cam cleat assembly.

5. The cord tensioning apparatus of claim 1, wherein the first and second guide channels are longitudinally aligned with the groove.

6. The cord tensioning apparatus of claim 1, wherein the cord tensioning member is longitudinally aligned with the groove.

7. The cord tensioning apparatus of claim 1, wherein at least one of the first and second guides is integrally formed with the base.

8. The cord tensioning apparatus of claim 1, wherein at least one of the cord retaining and cord tensioning members is integrally formed with the base.

9. The cord tensioning apparatus of claim 1, wherein the cord retaining member is adapted to be coupled to an external structure.

10. The cord tensioning apparatus of claim 9, further wherein the cord retaining member is provided as a cylindrical loop.

11. The cord tensioning apparatus of claim 1, wherein the coupling device includes a clip hingedly connected to the cord retaining member.

12. The cord tensioning apparatus of claim 11, wherein the clip is adapted to selectively open the cord receiving aperture.

13. The cord tensioning apparatus of claim 1, wherein the coupling device is coupled to the cord retaining member and is substantially aligned with the groove.

14. A cord tensioning apparatus, comprising:
a first guide;
a cord retaining member adjacent to the first guide, the cord retaining member including a cord receiving aperture defined therein adapted to receive the cord;
a second guide;
a cord cleat coupled between the first and second guides, the cord cleat including a groove, the cord cleat adapted to grip a portion of a cord occupying a cord gripping region within the groove; and
a coupling device fixedly coupled to the cord retaining member, the coupling device adapted to couple the cord tensioning apparatus to an external structure,
wherein the first and second guides are adapted to receive a cord and restrict a movement of the cord within the cord cleat,
wherein a channel of the first guide is grooved in a direction horizontally transverse to a first longitudinal axis of a cord receiving aperture and in a horizontal direction relative to a longitudinal axis of the apparatus for minimizing wear of the cord while traveling through the apparatus,
wherein a channel of the second guide is grooved in a direction horizontally transverse to a second longitudinal axis of a cord receiving aperture and in a horizontal direction relative to a longitudinal axis of the apparatus for minimizing wear of the cord while traveling through the apparatus,
wherein a degree to which the cord is gripped within the cord gripping region comprises a condition selected from a group consisting essentially of:
varying in a direction progressing along a length of the groove from the first guide to the second guide;

remaining substantially constant along a length of the groove from the first guide to the second guide, and
wherein the cord is adjustable while the portion of the cord is disposed in the groove,
wherein the cord is biasable into the groove, whereby a biased cord portion is provided, and whereby a degree to which the cord gripping region frictionally engages the biased cord portion increases by pulling the cord in a cord-tensioning direction, and
wherein the cord is debiasable from the groove, whereby a debiased cord portion is provided, and whereby a degree to which the cord gripping region frictionally engages the debiased cord portion decreases by pulling the cord in a direction opposite to the cord-tensioning direction.

15. The cord tensioning apparatus of claim 14, wherein at least two of the first guide, the second guide, and the cord cleat are integrally formed together.

16. The cord tensioning apparatus of claim 14, wherein the cord cleat includes a cam cleat assembly.

17. A method of securing a cord to an external structure, comprising:
providing a cord having a free end and a loaded end;
providing a coupling device fixedly coupled to the cord retaining member, the coupling device providing step comprising adapting the coupling device to couple the cord tensioning apparatus to an external structure;
inserting a free end through a first guide of a cord tensioning apparatus, whereby a channel of the first guide, being grooved in a direction horizontally transverse to a first longitudinal axis of the cord receiving aperture and in a horizontal direction relative to a longitudinal axis of the apparatus, minimizes wear of the cord while traveling through the apparatus;
guiding the inserted free end through a cord cleat coupled to the first guide;
threading the guided free end through a second guide coupled to the cord cleat, whereby a channel of the second guide, being grooved in a direction horizontally transverse to a second longitudinal axis of the cord receiving aperture and in a horizontal direction relative to a longitudinal axis of the apparatus, minimizes wear of the cord while traveling through the apparatus; and
pulling on the threaded free end to remove slack between the loaded end and the cord tensioning apparatus,
whereby the pulling step comprises gripping the cord to a degree selected from a group consisting essentially of:
varying in a direction progressing along the length of the groove from the first guide to the second guide; and
remaining substantially constant along the length of the groove from the first guide to the second guide,
wherein the cord is adjustable while the portion of the cord is disposed in the groove,
wherein the cord is biasable into the groove, whereby a biased cord portion is provided, and whereby a degree to which the cord gripping region frictionally engages the biased cord portion increases by pulling the cord in a cord-tensioning direction, and
wherein the cord is debiasable from the groove, whereby a debiased cord portion is provided, and whereby a degree to which the cord gripping region frictionally engages the debiased cord portion decreases by pulling the cord in a direction opposite to the cord-tensioning direction.

18. The method of claim 17, further comprising securing the cord tensioning apparatus to an external structure.

19. A cord tensioning apparatus, comprising:
a base;

a first guide coupled to the base, the first guide including a first guide channel defined therein adapted to receive a cord;

a cord retaining member adjacent to the first guide, the cord retaining member including a cord receiving aperture defined therein adapted to receive the cord;

a second guide coupled to the base, the second guide including a second channel defined therein adapted to receive the cord;

a cord cleat coupled to the base between the first and second guides, the cord cleat including a groove extending longitudinally between the channels of the first and second guides, the cord cleat adapted to grip a portion of a cord occupying a cord gripping region within the groove;

a cord tensioning member coupled to the base and aligned with the channel of the second guide, the cord tensioning member including a cord contacting surface adapted to contact a portion of the cord; and a coupling device fixedly coupled to the cord retaining member, the coupling device adapted to couple the cord tensioning apparatus to an external structure, wherein the channel of the first guide is elevationally disposed between the cord gripping region and an end of the cord receiving aperture, wherein the channel of the second guide is elevationally disposed between the cord gripping region and the cord contacting surface, wherein the channel of the first guide is grooved in a direction horizontally transverse to a first longitudinal axis of the cord receiving aperture and in a horizontal direction relative to a longitudinal axis of the apparatus for minimizing wear of the cord while traveling though the apparatus, wherein the channel of the second guide is grooved in a direction horizontally transverse to a second longitudinal axis of the cord receiving aperture and in a horizontal direction relative to a longitudinal axis of the apparatus for minimizing wear of the cord while traveling through the apparatus, wherein a degree to which the cord is gripped within the cord gripping region comprises a condition selected from a group consisting essentially of:

varying in a direction progressing along the length of the groove from the first guide to the second guide; and remaining substantially constant along the length of the groove from the first guide to the second guide, wherein the cord cleat is integrally formed with the base, wherein the cord cleat includes a jam cleat assembly, wherein the cord cleat includes a cam cleat assembly, wherein the first and second guide channels are longitudinally aligned with the groove, wherein the cord tensioning member is longitudinally aligned with the groove, wherein at least one of the first and second guides is integrally formed with the base, wherein at least one of the cord retaining and cord tensioning members is integrally formed with the base, wherein the cord retaining member is adapted to be coupled to an external structure, wherein the cord retaining member is provided as a cylindrical loop, wherein the coupling device includes a clip hingedly connected to the cord retaining member, wherein the clip is adapted to selectively open the cord receiving aperture, wherein the coupling device is coupled to the cord retaining member and is substantially aligned with the groove, wherein the cord is adjustable while the portion of the cord is disposed in the groove, wherein the cord is biasable into the groove, whereby a biased cord portion is provided, and whereby a degree to which the cord gripping region frictionally engages the biased cord portion increases by pulling the cord in a cord-tensioning direction, and wherein the cord is debiasable from the groove, whereby a debiased cord portion is provided, and whereby a degree to which the cord gripping region frictionally engages the debiased cord portion decreases by pulling the cord a direction opposite to the cord-tensioning direction.

20. A method of securing a cord to an external structure, comprising:

providing a coupling device fixedly coupled to a cord retaining member, the coupling device providing step comprising adapting the coupling device to couple a cord tensioning apparatus to the external structure, wherein the coupling device providing step comprises providing a clip hingedly connected to the cord retaining member;

providing a cord having a free end and a loaded end;

inserting a free end through a first guide of a cord tensioning apparatus, whereby a channel of the first guide, being grooved in a direction horizontally transverse to a first longitudinal axis of the cord receiving aperture and in a horizontal direction relative to a longitudinal axis of the apparatus, minimizes wear of the cord while traveling through the apparatus, guiding the inserted free end through a cord cleat coupled to the first guide;

threading the guided free end through a second guide coupled to the cord cleat, whereby a channel of the second guide, being grooved in a direction horizontally transverse to a second longitudinal axis of the cord receiving aperture and in a horizontal direction relative to a longitudinal axis of the apparatus, minimizes wear of the cord while traveling through the apparatus;

pulling on the threaded free end to remove slack between the loaded end and the cord tensioning apparatus, whereby the pulling step comprises gripping the cord to a degree selected from a group consisting essentially of:

varying in a direction progressing along the length of the groove from the first guide to the second guide;

remaining substantially constant along the length of the groove from the first guide to the second guide; and securing the cord tensioning apparatus to an external structure, wherein the cord is adjustable while the portion of the cord is disposed in the groove, wherein the cord is biasable into the groove, whereby a biased cord portion is provided, and whereby a degree to which the cord gripping region frictionally engages the biased cord portion increases by pulling the cord in a cord-tensioning direction, and wherein the cord is debiasable from the groove, whereby a debiased cord portion is provided, and whereby a degree to which the cord gripping region frictionally engages the debiased cord portion decreases by pulling the cord a direction opposite to the cord-tensioning direction.

* * * * *